(12) United States Patent
Suntharalingam et al.

(10) Patent No.: US 9,145,136 B2
(45) Date of Patent: Sep. 29, 2015

(54) POWERTRAIN SYSTEM FOR HYBRID VEHICLES HAVING COMPOUND AND SPLIT MODES OF OPERATION

(71) Applicant: McMaster University, Hamilton (CA)

(72) Inventors: Piranavan Suntharalingam, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 206 days.

(21) Appl. No.: 13/850,741

(22) Filed: Mar. 26, 2013

(65) Prior Publication Data

US 2013/0252783 A1 Sep. 26, 2013

Related U.S. Application Data

(60) Provisional application No. 61/615,649, filed on Mar. 26, 2012.

(51) Int. Cl.
| | |
|---|---|
| *F16H 3/72* | (2006.01) |
| *F16H 37/06* | (2006.01) |
| *B60W 20/00* | (2006.01) |
| *B60K 6/365* | (2007.10) |
| *B60K 6/387* | (2007.10) |
| *B60K 6/445* | (2007.10) |
| *B60K 6/38* | (2007.10) |

(52) U.S. Cl.
CPC ............... *B60W 20/40* (2013.01); *B60K 6/365* (2013.01); *B60K 6/387* (2013.01); *B60K 6/445* (2013.01); *B60K 2006/381* (2013.01); *F16H 2200/0021* (2013.01); *Y02T 10/6239* (2013.01); *Y10S 903/902* (2013.01); *Y10T 477/26* (2015.01)

(58) Field of Classification Search
CPC ............................................... F16H 2200/0021
See application file for complete search history.

(56) References Cited

U.S. PATENT DOCUMENTS

| | | | |
|---|---|---|---|
| 4,405,029 A | 9/1983 | Hunt | |
| 4,862,009 A | 8/1989 | King | |
| 5,713,425 A | 2/1998 | Buschhaus et al. | |
| 5,847,470 A | 12/1998 | Mitchell | |
| 6,008,545 A | 12/1999 | Nagano et al. | |
| 6,041,877 A | 3/2000 | Yamada et al. | |
| 6,258,006 B1 | 7/2001 | Hanyu et al. | |
| 6,319,168 B1 | 11/2001 | Morris et al. | |
| 6,332,257 B1 | 12/2001 | Reed, Jr. et al. | |
| 6,478,705 B1 | 11/2002 | Holmes et al. | |
| 6,533,692 B1 | 3/2003 | Bowen | |
| 6,558,283 B1 * | 5/2003 | Schnelle | 475/5 |
| 6,592,484 B1 | 7/2003 | Tsai et al. | |
| 6,603,215 B2 | 8/2003 | Kuang et al. | |
| 6,604,591 B2 | 8/2003 | Bowen et al. | |
| 6,645,105 B2 | 11/2003 | Kima | |
| 6,719,655 B2 * | 4/2004 | Kramer | 475/5 |
| 6,784,563 B2 | 8/2004 | Nada | |

(Continued)

*Primary Examiner* — Tisha Lewis
(74) *Attorney, Agent, or Firm* — Bereskin & Parr LLP/S.E.N.C.R.L. s.r.l.

(57) ABSTRACT

A powertrain system for a vehicle is provided, including an internal combustion engine, a drivetrain gear for connection to a drivetrain of the vehicle, a gearset connecting the internal combustion engine to the drivetrain gear, a first electric machine connected to the gearset, a second electric machine, and at least one dynamic clutch selectively coupling the second electric machine to the drivetrain gear and the gearset. In a compound mode of operation, the at least one dynamic clutch couples the second electric machine and the gearset. In a split mode of operation, the at least one dynamic clutch couples the second electric machine and the drivetrain gear.

14 Claims, 6 Drawing Sheets

(56) References Cited

U.S. PATENT DOCUMENTS

| | | |
|---|---|---|
| 6,837,816 B2 | 1/2005 | Tsai et al. |
| RE41,034 E | 12/2009 | Lilley et al. |
| 8,011,461 B2 | 9/2011 | Rodriguez et al. |
| 2002/0082134 A1 | 6/2002 | Hirt et al. |
| 2003/0032515 A1* | 2/2003 | Holmes ............................. 475/5 |
| 2006/0063629 A1* | 3/2006 | Minagawa et al. ................ 475/5 |
| 2007/0105678 A1* | 5/2007 | Bucknor et al. ................... 475/5 |
| 2008/0039257 A1* | 2/2008 | Holmes ............................. 475/5 |
| 2008/0103002 A1* | 5/2008 | Holmes ............................. 475/5 |
| 2010/0000807 A1 | 1/2010 | Rodriguez et al. |
| 2012/0149520 A1* | 6/2012 | Schneidewind et al. ....... 475/149 |
| 2013/0090202 A1* | 4/2013 | Hiraiwa ............................ 475/5 |

* cited by examiner

POWERTRAIN SYSTEM FOR HYBRID VEHICLES HAVING COMPOUND AND SPLIT MODES OF OPERATION

CROSS-REFERENCE TO RELATED APPLICATION

This application claims the benefit of U.S. Provisional Application No. 61/615,649 filed Mar. 26, 2012, the entire contents of which are hereby incorporated herein by reference.

TECHNICAL FIELD

The present disclosure relates to powertrain systems for hybrid vehicles.

BACKGROUND

U.S. Pat. No. 6,258,006 describes a transmission including a first power transfer path for transferring an output of an engine to a vehicle driving shaft through a planetary gear connected to a motor, a second power transfer path for transferring the output of the engine to the vehicle driving shaft through gears and, and a power transfer switch which switches over the first and second power transfer paths from one to the other. In a hybrid vehicle wherein an engine, a motor and a generator are connected to a planetary gear, a follow-up loss caused by the generator is avoided in the case where the engine stops and the vehicle travels with the motor alone. In high-speed running, it is avoided that an electric energy for stopping the rotation of the generator is consumed. Further, torque assist by the generator is not restricted by constraints of the planetary gear.

U.S. Pat. No. 6,478,705 describes a hybrid electric powertrain including an electrically variable transmission having two differential gearsets coupled to an engine and first and second electrical machines, wherein the gearsets are configurable in input-split and compound-split modes, and wherein shifting between the input-split and compound-split modes occurs at a zero speed point of one of the electric machines for synchronous clutch engagement. The input-split mode provides reverse and low forward ranges, with the first machine operated as a motor and the second as a generator. The compound-split mode provides a high forward range, with the machines selectively operated in motoring or generating modes depending on the speed of the vehicle. Shifting between the input-split and compound-split modes occurs synchronously, and at a zero speed of the first machine, contributing to an exceptionally smooth shift.

U.S. Pat. No. 6,604,591 describes a drive axle adapted for use in hybrid vehicles and having an electric motor and a gearbox packaged within a common housing assembly. The gearbox includes a differential assembly driven by a planetary-type reduction unit. The reduction unit includes a first planetary gearset having a first sun gear driven by the motor, a first ring gear, and a set of first planet gears meshed with the first sun gear and the first ring gear. A first planet carrier is non-rotatably fixed to a stationary number and rotatably supports the first planet gears. A second planet gearset includes a second sun gear fixed for rotation with the first ring gear, a second ring gear non-rotatably fixed to the stationary member, and a set of second planet gears rotatably supported from a second planet carrier and which mesh with the second sun gear and the second ring gear.

U.S. Pat. No. 6,837,816 describes a motor-integrated transmission mechanism for use in parallel hybrid electric vehicles. The transmission can provide five basic modes of operation that can be further classified into sixteen sub-modes: one electric motor mode, four engine modes, four engine/charge modes, three power modes and four regenerative braking modes. Each of these sub-modes can be grouped into like clutching conditions, providing the functional appearance of a conventional 4-speed automatic transmission, with electric launch, engine-only, engine/charge, power-assist, and regeneration capability. CVT capability is provided with one of the engine/charge modes. The transmission can be incorporated in front-wheel drive and in rear-wheel drive vehicles.

INTRODUCTION

The following paragraphs are intended to introduce the reader to the more detailed description that follows and not to define or limit the claimed subject matter.

According to an aspect of the present disclosure, a powertrain system for a vehicle is provided. The powertrain system includes an internal combustion engine, a drivetrain gear for connection to a drivetrain of the vehicle, a gearset connecting the internal combustion engine to the drivetrain gear, a first electric machine connected to the gearset, a second electric machine, and at least one dynamic clutch selectively coupling the second electric machine to the drivetrain gear and the gearset. In a compound mode of operation, the at least one dynamic clutch couples the second electric machine and the gearset. In a split mode of operation, the at least one dynamic clutch couples the second electric machine and the drivetrain gear.

According to another aspect of the invention a vehicle is provided, the vehicle including an internal combustion engine, at least one drive axle, a gearset connecting the at least one internal combustion engine to the at least one drive axle, a first electric machine connected to the gearset, a second electric machine, and at least one dynamic clutch selectively coupling the second electric machine to the at least one drive axle and the gearset. In a compound mode of operation, the at least one dynamic clutch couples the second electric machine and the gearset. In a split mode of operation, the at least one dynamic clutch couples the second electric machine and the at least one drive axle.

According to yet another aspect of the invention a powertrain system for a vehicle. The powertrain system includes an internal combustion engine, a drivetrain gear for connection to a drivetrain of the vehicle, a gearset connecting the internal combustion engine to the drivetrain gear, a first electric machine comprising a first rotor and a first stator, a shaft connecting the first electric machine to the gearset, and defining a shaft axis, a second electric machine comprising a second rotor and second stator, and at least one dynamic clutch selectively coupling the second electric machine to the drivetrain gear and the gearset. The first and second electric machines are operable independently as an electric motor and electric generators, and the first rotor and stator are arranged concentrically about the shaft axis, and the second rotor and stator are arranged concentrically about the shaft axis.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods are described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Figure 1:
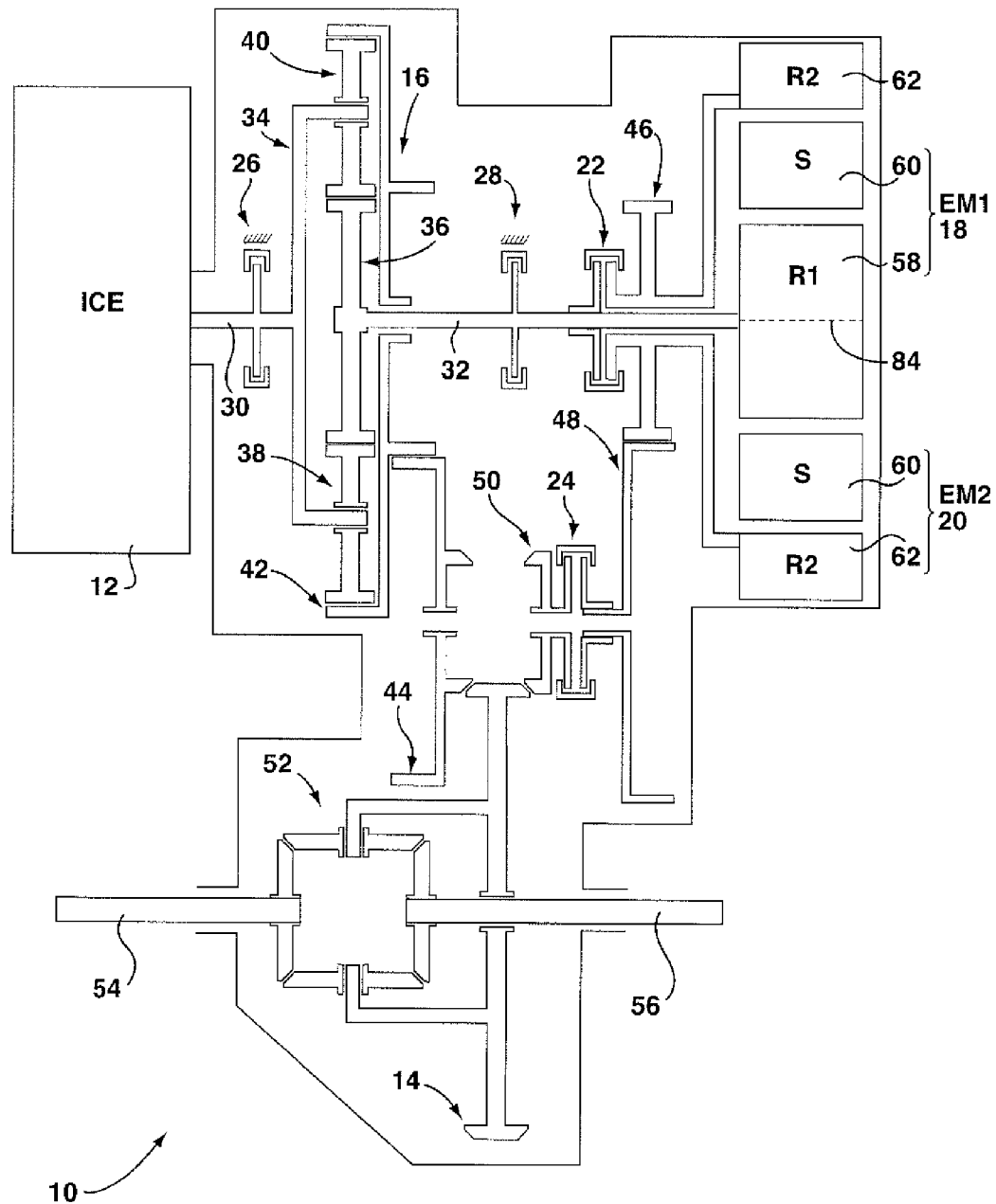
FIG. 1 is a schematic view of a powertrain system for a hybrid vehicle according to a first example.

Referring to FIG. 1, a powertrain system for a hybrid vehicle is shown generally at reference numeral 10. The powertrain system 10 includes an internal combustion engine 12, a drivetrain gear 14, a gearset 16 connecting the internal combustion engine 12 to the drivetrain gear 14, and first and second electric machines 18, 20. In some examples, the first and second electric machines 18, 20 can be operated independently, and each as an electric motor and as an electric generator.

In the example illustrated, the powertrain system 10 includes dynamic clutches 22, 24. The dynamic clutches 22, 24 can be selectively operated to achieve a compound mode and a split mode input from the second electric machine 20. During the compound mode of operation, the dynamic clutch 22 is engaged and the dynamic clutch 24 is disengaged or released, and therefore the second electric machine 20 can act as a torque coupler to the powertrain system 10 for relatively low speed acceleration/driving conditions or relatively low speed regenerative braking conditions. During the split mode of operation, the dynamic clutch 22 is disengaged or released and the dynamic clutch 24 is engaged, and therefore the second electric machine 20 can act as a speed coupler to the powertrain system 10 for relatively high speed acceleration/driving conditions or relatively high speed regenerative braking conditions. In some examples, the dynamic clutches 22, 24 can be electro-mechanically actuated. In other examples, the dynamic clutches 22, 24 can be hydraulically, mechanically and/or pneumatically actuated.

In the example illustrated, the powertrain system 10 includes static clutches 26, 28. The static clutch 26 can be integrated with a shaft 30 connecting the internal combustion engine 12 and the gearset 16. The static clutch 28 can be integrated with a shaft 32 connecting the first electric machine 18 and the gearset 16. Depending upon desired operating requirements of the powertrain system 10, the static clutches 26, 28 can be selectively operated to ground the internal combustion engine 12 and the first electric machine 18, respectively. In some examples, the static clutches 26, 28 can be electro-mechanically actuated. In other examples, the static clutches 26, 28 can be hydraulically, mechanically and/or pneumatically actuated.

In the example illustrated, the gearset 16 takes the form of a planetary gearset, and includes a planetary carrier 34, a sun gear 36, pinion gears 38, 40, and a wheel gear 42. The planetary carrier 34 and the internal combustion engine 12 are connected by the shaft 30. The sun gear 36 and the first electric machine 18 are connected by the shaft 32, which extends lengthwise to define a shaft axis 84. The wheel gear 42 is connected with the drivetrain gear 14 via a reduction gear 44.

In the example illustrated, an output gear 46 connects the second electric machine 20 with the drivetrain gear 14 via reduction gears 48, 50. The powertrain system 10 is also shown to include a differential gearset 52, which includes the drivetrain gear 14, and first and second drive axles 54, 56 connected to the drivetrain gear 14. In some examples, the first and second drive axles 54, 56 can be used to power front wheels of the vehicle. In some examples, the first and second drive axles 54, 56 can be used to power rear wheels of the vehicle.

In some examples, the clutches 22, 24, 26, 28 can be incorporated in the powertrain system 10 to avoid idling of the first and second electric machines 18, 20, and to lock components. Although it can be possible to electrically lock the first and second electric machines 18, 20, depending on driving conditions a significant amount of electric energy can be required to achieve lock out. The clutches 22, 24, 26, 28 can be used to help avoid this energy loss in the powertrain system 10. Furthermore, although the internal combustion engine 12 can be lockable, e.g., by controlling cylinder pressure, holding torque requirements can vary, e.g., depending upon the negative torque generated by the drive axles 54, 56. With the power rating of the internal combustion engine 12, the holding torque can vary and can affect acceleration and regenerative braking performance of the vehicle during electric mode operation. Therefore, to avoid performance deterioration, the static clutch 26 can be optionally incorporated with the powertrain system 10.

As mentioned above, the powertrain system 10 can achieve two modes of operation of the second electric machine 20. The two modes of operation can enhance kinetic energy recovery from regenerative braking for a wide range of vehicle speeds. For example, at high speed braking conditions, the second electric machine 20 can be coupled with the drivetrain gear 14 of the differential gearset 52, via the reduction gear 50, the dynamic clutch 24, the reduction gear 48 and the output gear 46. At low speed braking conditions, the second electric machine 20 can be coupled with the drivetrain gear 14 of the differential gearset 52, via the reduction gear 44, the wheel gear 42, the pinion gears 38, 40, the sun gear 36, the shaft 32 and the dynamic clutch 22. Therefore, rotational speed of the second electric machine 20 can be maintained at relatively high levels for a wide range of vehicle speeds. Since the back electromotive force (EMF) of the second electric machine 20 can be generally proportional to the rotational speed, kinetic energy recovery can be effectively increased to enhance fuel economy of the powertrain system 10. Operating flexibility of the powertrain system 10 can also achieve improved acceleration performance.

As mentioned above, the first and second electric machines 18, 20 can be operated independently, which can significantly enhance reliability of the powertrain system 10 during failure of any of the power sources. For example, each of the first and second electric machines 18, 20 can be operated independently as a starter motor to start the internal combustion engine 12. Therefore, failure of the first electric machine 18 alone does not affect the starting mode of the internal combustion engine 12, as the second electric machine 20 can be used. Other power flow conditions can be achieved during failure of any of the power sources, to avoid breakdown. Having each of the power sources be operated independently can also minimize idling and extend operating life of components such as bearings.

In the example illustrated, the first electric machine 18 is formed by a first rotor 58 and a stator 60, and the second electric machine 20 is formed by a second rotor 62 and the stator 60. In operation, the first rotor 58 can rotate about the shaft axis 84 relative to the stator 60, and the second rotor 62 can rotate about the shaft axis 84 relative to the stator 60. Therefore, the first rotor 58, the stator 60 and the second rotor 62 can be arranged concentrically about the shaft axis 84, and the first and second electric machines 18, 20 can overlap in a direction parallel to the shaft axis 84. In this manner, the first and second electric machines 18, 20 can be arranged within a single envelop, which can reduce sizing requirements of the powertrain system 10.

Figures 3A, 3B, 3C:
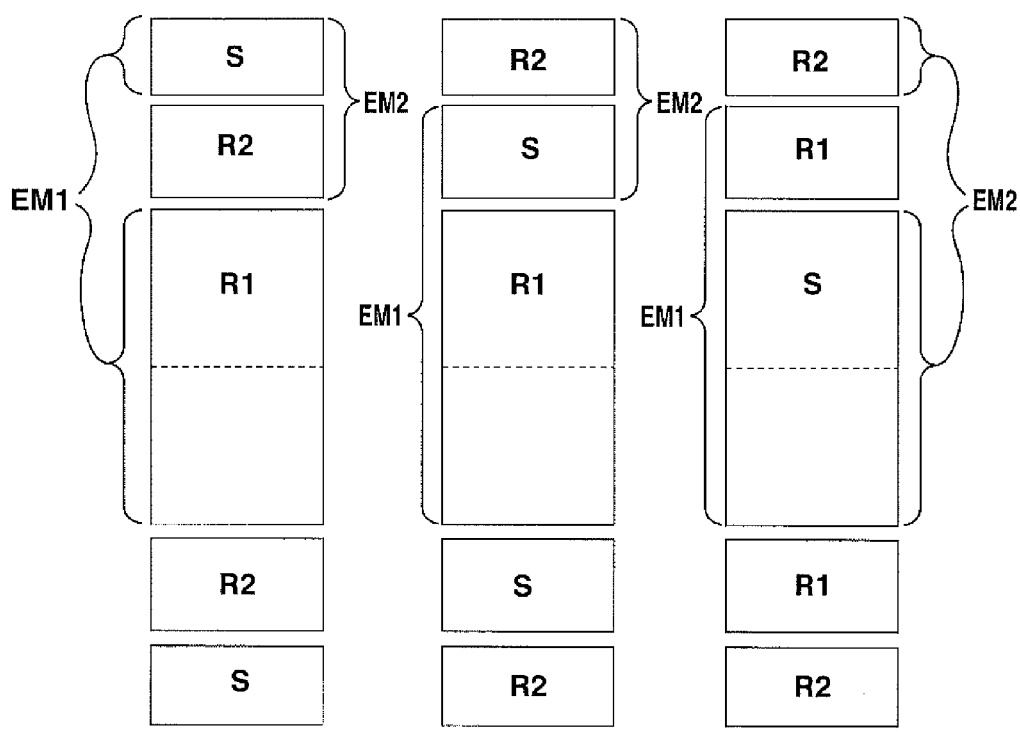
FIGS. 3A, 3B and 3C are schematic views of different configurations of exemplary electric machines.
Figures 4A, 4B, 4C, 4D:
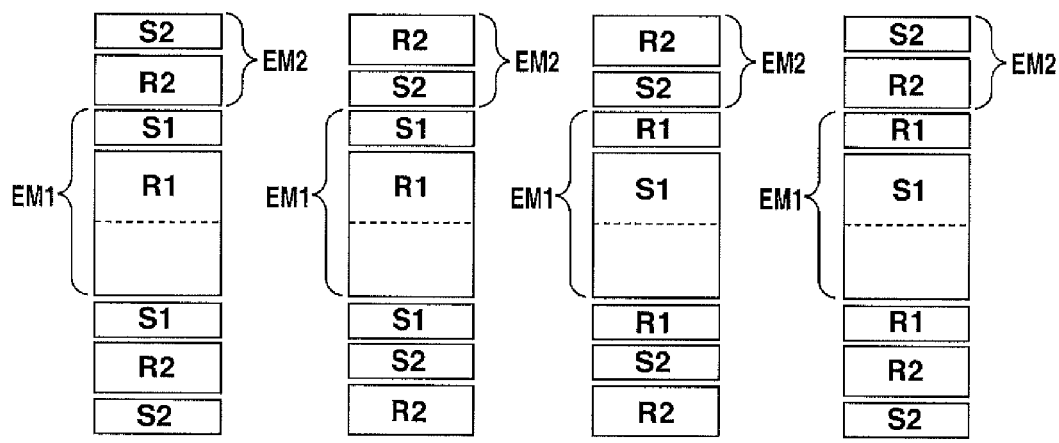
FIGS. 4A, 4B, 4C and 4D are schematic views of additional configurations of exemplary electric machines.

Referring now to FIGS. 3A, 3B and 3C, three alternative configurations of two electric machines are shown, each including two rotors and one stator. FIGS. 4A, 4B, 4C and 4D show four alternative configurations of two electric machines, each including two rotors and two stators. In each case, the components of the electric machines are arranged concentrically about a common axis, which is indicated by the broken line, and the electric machines overlap in a direction parallel to the axis. In various examples, the configurations illustrated FIGS. 3A, 3B, 3C, 4A, 4B, 4C and 4D can be implemented as the first and second electric machines 18, 20 of the powertrain system 10.

Figure 2:
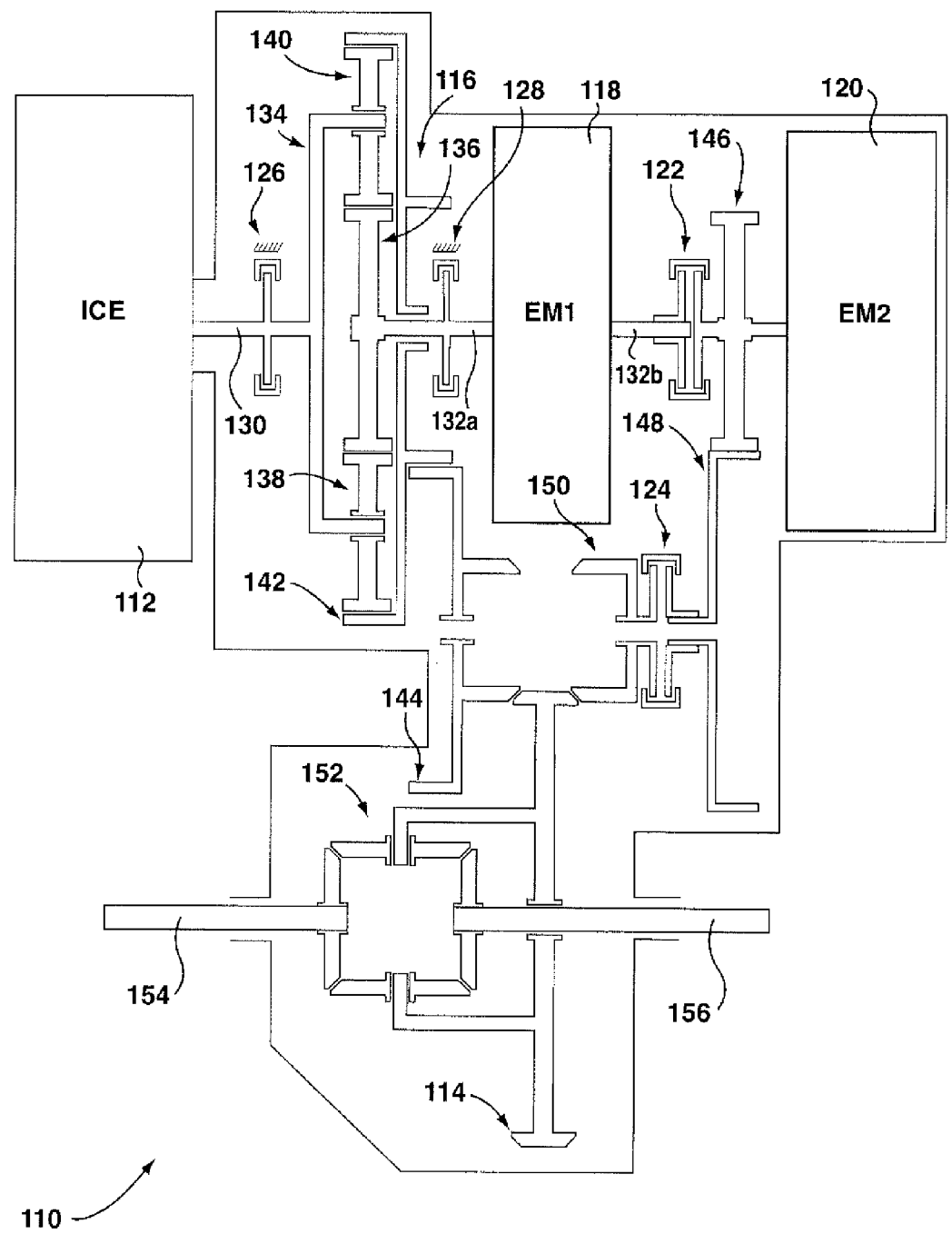
FIG. 2 is a schematic view of a powertrain system for a hybrid vehicle according to a second example.

Referring now to FIG. 2, a powertrain system 110 includes a first electric machine 118 and a second electric machine 120, which are illustrated as separate components. In various examples, the first and second electric machines 118, 120 can take the form of various types of electric machines, including: switch reluctance machines; induction machines; and/or permanent magnet machines. Because the first and second electric machines 118, 120 are separated, a first shaft 132*a* connects the first electric machine 118 and a gearset 116, and a second shaft 132*b* connects the second electric machine 120 and the first electric machine 118 via a dynamic clutch 122. Otherwise, operating principles and power flow patterns of the powertrain system 110 depicted in FIG. 2 can be generally similar to the powertrain system 10 depicted in FIG. 1, and the description of elements will not be repeated.

While FIGS. 1 and 2 shows the main mechanical components of the powertrain systems 10, 100, the powertrain systems 10, 100 can further include various electrical components that are not shown in FIGS. 1 and 2. For example, the powertrain system 10 can further include a battery, sensors, electrical connections, and one or more control units for controlling operation of the first and second electric machines 18, 20.

Referring back to FIG. 1, the clutches 22, 24, 26, 28 can be selectively operated to deliver power to the drivetrain gear 14 and transfer tractive power to wheels of the vehicle. As mentioned above, the compound and split modes of operation of the second electric machine 20 can significantly enhance operating performance of the powertrain system 10 by acting as a torque coupler during low speed operation, and as a speed coupler during high speed operation. Furthermore, the powertrain system 10 can be flexible to operate in various different modes to achieve greater efficiency, including starting, series-parallel hybrid, parallel hybrid, pure electric, and conventional modes. Various operational modes and power flows are now described.

The powertrain system 10 can have two starting modes. In the first starting mode, the first electric machine 18 can be used to start the internal combustion engine 12. In this mode, each of the clutches 22, 24, 26, 28 is released, and the first electric machine 18 can operate as a motor to supply power to the internal combustion engine 12. In the second starting mode, the second electric machine 20 can be used to start to the internal combustion engine 12. In this mode, the clutch 22 is engaged, the clutches 22, 26, 28 are released, and the second electric machine 20 can operate as a motor to supply power to the internal combustion engine 12.

The powertrain system 10 can have a series-parallel hybrid mode. In this mode, the clutch 24 is engaged, the clutches 22, 26, 28 are released, the first electric machine 18 can operate as a generator, and the second electric machine 20 can operate as a motor. A portion of power generated by the internal combustion engine 12 can be transferred to the first electric machine 18 via the shaft 32. Power generated by the first electric machine 18 can be transferred to the second electric machine 20. Power generated by the second electric machine 20 can be transferred to the drivetrain gear 14 via the gears 46, 48, 50. The remainder of the power generated by the internal combustion engine 12 can be transferred to the drivetrain gear 14 via the gearset 16 and the reduction gear 44.

The powertrain system 10 can have four parallel hybrid modes, described as follows.

In the first parallel hybrid mode, each of the clutches 22, 24, 26, 28 is released, and the first electric machine 18 can operate as a motor. Power generated by the first electric machine 18 and the internal combustion engine 12 can be transferred to the drivetrain gear 14 via the gearset 16 and the reduction gear 44.

In the second parallel hybrid mode, the clutch 24 is engaged, the clutches 22, 26, 28 are released, and the first and second electric machines 18, 20 can operate as motors. Power generated by the second electric machine 20 can be transferred to the drivetrain gear 14 via the gears 46, 48, 50. Power generated by the first electric machine 18 and the internal combustion engine 12 can be transferred to the drivetrain gear 14 via the gearset 16 and the reduction gear 44. In this mode, the second electric machine 20 is acting as a speed coupler to increase the speed output at the drivetrain gear 14.

In the third parallel hybrid mode, the clutch 22 is engaged, the clutches 24, 26, 28 are released, and the first and second electric machines 18, 20 can operate as motors. Power generated by the first and second electric machines 18, 20 and the internal combustion engine 12 can be transferred to the drivetrain gear 14 via the gearset 16 and the reduction gear 44. In this mode, the second electric machine 20 is acting as a torque coupler to increase the torque output at the drivetrain gear 14.

In the fourth parallel hybrid mode, the clutches 24, 28 are engaged, the clutches 22, 26 are released, and the second electric machine 20 can operate as a motor. Power generated by the second electric machine 20 can be transferred to the drivetrain gear 14 via the gears 46, 48, 50. Power generated by the internal combustion engine 12 can be transferred to the drivetrain gear 14 via the gearset 16 and the reduction gear 44.

The powertrain system 10 can have five electric modes, described as follows. In the description of the electric modes, the first electric machine 18 and/or the second electric machine 20 are operating as electric motors. There can be similar modes of operation for regenerative braking using the first and second electric machines 18, 20, in which the flow of power is generally in reverse.

In the first electric mode, the clutches 24, 26 are engaged, the clutches 22, 28 are released, and the first and second electric machines 18, 20 can operate as motors. Power generated by the second electric machine 20 can be transferred to the drivetrain gear 14 via the gears 46, 48, 50. Power generated by the first electric machine 18 can be transferred to the drivetrain gear 14 via the gearset 16 and the reduction gear 44. In this mode, the second electric machine 20 is acting as a speed coupler.

In the second electric mode, the clutches 22, 26 are engaged, the clutches 24, 28 are released, and the first and second electric machines 18, 20 can operate as motors. Power generated by the first and second electric machines 18, 20 can be transferred to the drivetrain gear 14 via the gearset 16 and the reduction gear 44. In this mode, the second electric machine 20 is acting as a torque coupler.

In the third electric mode, the clutches 24, 26 are engaged, the clutches 22, 28 are released, and the second electric machine 20 can operate as a motor. Power generated by the second electric machine 20 can be transferred to the drivetrain gear 14 via the gears 46, 48, 50.

In the fourth electric mode, the clutches 22, 26 are engaged, the clutches 24, 28 are released, and the second electric machine 20 can operate as a motor. Power generated by the second electric machine 20 can be transferred to the drivetrain gear 14 via the gearset 16 and the reduction gear 44.

In the fifth electric mode, the clutch 26 is engaged, the clutches 22, 24, 28 are released, and the first electric machine 18 can operate as a motor. Power generated by the first electric machine 18 can be transferred to the drivetrain gear 14 via the gearset 16 and the reduction gear 44.

The powertrain system 10 can further have a conventional mode. In this mode, the clutch 28 is engaged, and the clutches 22, 24, 26 are released. Power generated by the internal combustion engine 12 can be transferred to the drivetrain gear 14 via the gearset 16 and the reduction gear 44.

The powertrain systems described herein can be implemented in various hybrid electric vehicles, including plug-in hybrid vehicles, and can be implemented in hybrid vehicles having front-wheel drive, rear-wheel drive, four-wheel drive and/or all-wheel drivetrain systems. Furthermore, the powertrain systems can be scalable, and therefore can be applicable to vehicles including small passenger car, minivans, sports utility vehicles, pickup trucks, vans, buses and trucks. Other applications can be possible, including off-road vehicles, tractors, mining and construction vehicles, hybrid boats and other naval applications.

Figure 5:
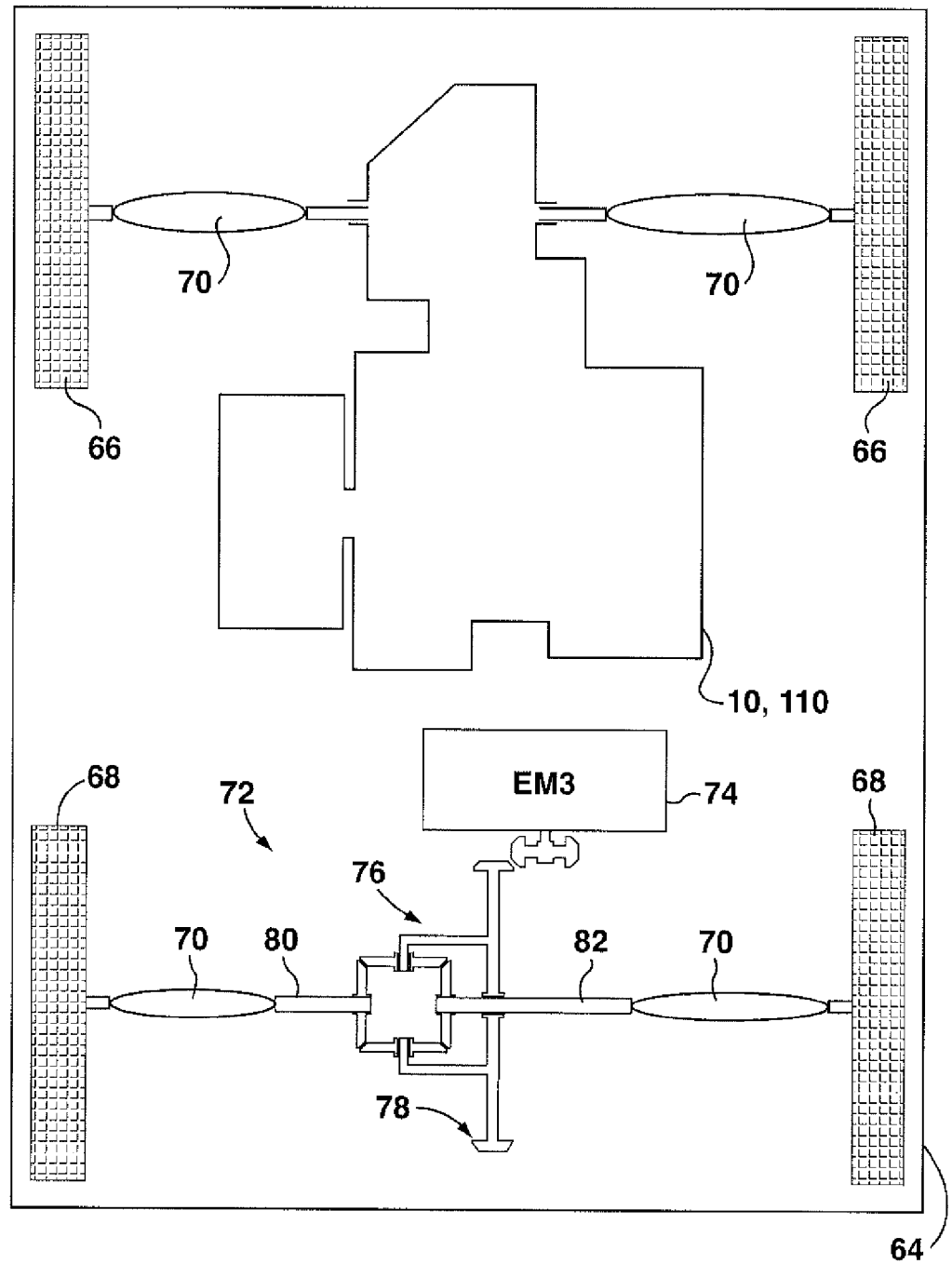
FIG. 5 is a schematic view of a vehicle including the powertrain systems of FIG. 1 or 2.

Referring now to FIG. 5, a vehicle 64 includes the powertrain system 10, 110, which is implemented as part of a four wheel drive or all-wheel drive system. The vehicle 64 includes front wheels 66 and rear wheels 68. In the example illustrated, the powertrain system 10, 110 is connected to the front wheels 66 by joints 70. The vehicle 64 includes a second powertrain system 72. The second powertrain system 72 is connected to the rear wheels 68 by joints 70. The second powertrain system 72 includes a third electric machine 74, and a differential gearset 76 including a drive axle 186 and a ring gear 78. The differential gearset 76 delivers power from the third electric machine 74 to the rear wheels 68.

Figure 6:
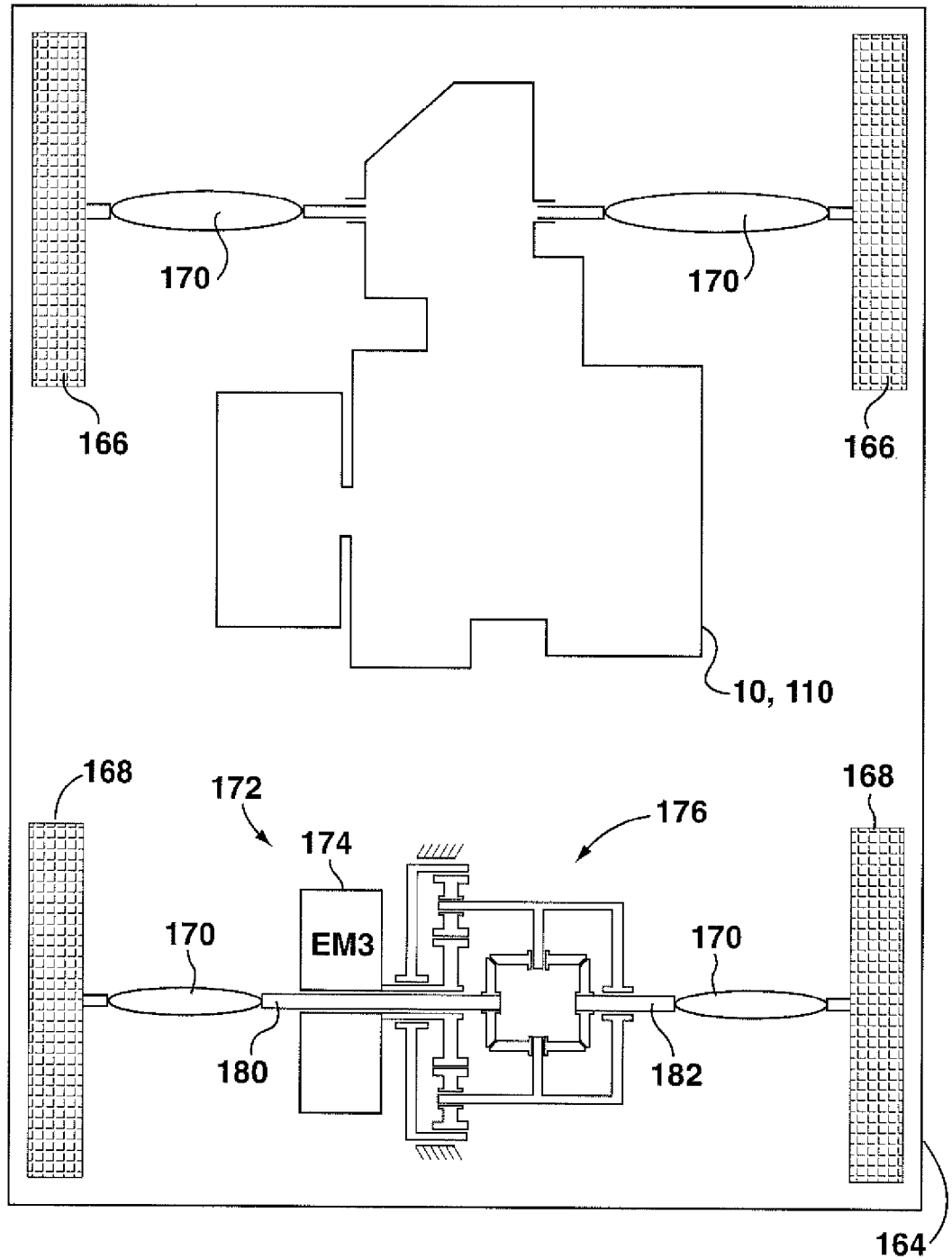
FIG. 6 is a schematic view of another vehicle including the powertrain systems of FIG. 1 or 2.

Similarly, FIG. 6 shows a vehicle 164 including the powertrain system 10, 110, also implemented as part of a four wheel drive or all-wheel drive system. In the example illustrated, a second powertrain system 170 includes a third electric machine 174, a planetary gearset 176, and drive axles 180, 182. The planetary gearset 176 delivers power from the third electric machine 174 to the rear wheels 168.

While the above description provides examples of one or more apparatuses or methods, it will be appreciated that other apparatuses or methods may be within the scope of the accompanying claims.

We claim:

1. A powertrain system for a vehicle, the powertrain system comprising:
   an internal combustion engine;
   a drivetrain gear for connection to a drivetrain of the vehicle;
   a gearset connecting the internal combustion engine to the drivetrain gear;
   a first electric machine comprising a first rotor and a first stator;
   a first shaft connecting the first electric machine to the gearset, and defining a shaft axis;
   a second electric machine comprising a second rotor and second stator; and
   at least one dynamic clutch selectively coupling the second electric machine to the drivetrain gear and the gearset,
   wherein the first and second electric machines are operable independently as an electric motor and an electric generator,
   wherein the first rotor and stator are arranged concentrically about the shaft axis, and the second rotor and stator are arranged concentrically about the shaft axis and
   wherein the at least one dynamic clutch comprises a first dynamic clutch, and, in a compound mode of operation, the first dynamic clutch connects the second electric machine to the first shaft for transferring power from the first and second electric machines to the gearset.

2. The powertrain system of claim 1, wherein the first and second stators are the same component.

3. The powertrain system of claim 1, wherein the first and second electric machines generally overlap in a direction parallel to the shaft axis.

4. The powertrain system of claim 1, wherein the at least one dynamic clutch comprises a second dynamic clutch, and, in a split mode of operation, the second dynamic clutch connects the second electric machine to at least one reduction gear for transferring power from the second electric machine to the drivetrain gear.

5. The powertrain system of claim 4, wherein the first and second stators are the same component.

6. The powertrain system of claim 4, wherein the first and second electric machines generally overlap in a direction parallel to the shaft axis.

7. The powertrain system of claim 4, wherein, in the compound mode of operation, the first dynamic clutch is engaged and the second dynamic clutch is released, and in the split mode of operation, the first dynamic clutch is released and the second dynamic clutch is engaged.

8. The powertrain system of claim 4, wherein the first and second dynamic clutches are electro-mechanically activated.

9. The powertrain system of claim 1, further comprising at least one static clutch for selectively grounding at least one of the internal combustion engine and the first electric machine.

10. The powertrain system of claim 9, wherein the at least one static clutch comprises a first static clutch integrated with the first shaft connecting the first electric machine and the gearset.

11. The powertrain system of claim 10, wherein the at least one static clutch comprises a second static clutch integrated with a second shaft connecting the internal combustion engine and the gearset.

12. The powertrain system of claim 11, wherein the first and second static clutches are electro-mechanically activated.

13. A powertrain system for a vehicle, the powertrain system comprising:
- an internal combustion engine;
- a drivetrain gear for connection to a drivetrain of the vehicle;
- a gearset connecting the internal combustion engine to the drivetrain gear;
- a first electric machine;
- a first shaft connecting the first electric machine to the gearset;
- a second electric machine;
- a first dynamic clutch selectively coupling the second electric machine to the gearset;
- a second dynamic clutch selectively coupling the second electric machine to the drivetrain gear; and
- a first static clutch integrated with the first shaft for selectively grounding the first electric machine,
- wherein the first and second electric machines are operable independently as an electric motor and an electric generator,
- wherein, in a compound mode of operation, the first dynamic clutch connects the second electric machine to the first shaft for transferring power from the first and second electric machines to the gearset, and
- wherein, in a split mode of operation, the second dynamic clutch connects the second electric machine to at least one reduction gear for transferring power from the second electric machine to the drivetrain gear.

14. The powertrain system of claim 13, further comprising a second static clutch integrated with a second shaft connecting the internal combustion engine and the gearset.

\* \* \* \* \*